(12) United States Patent
Liang et al.

(10) Patent No.: US 11,256,228 B2
(45) Date of Patent: Feb. 22, 2022

(54) HINGE MECHANISM, ELECTRONIC DEVICE AND METHOD CAPABLE OF AUTOMATICALLY EXECUTING ANGLE ROTATION

(71) Applicant: Wistron Corporation, New Taipei (TW)

(72) Inventors: Chen-Yi Liang, New Taipei (TW); Cheng-Wei Chang, New Taipei (TW); Che-Wen Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 886 days.

(21) Appl. No.: 15/412,070

(22) Filed: Jan. 23, 2017

(65) Prior Publication Data
US 2018/0039250 A1 Feb. 8, 2018

(30) Foreign Application Priority Data
Aug. 2, 2016 (TW) .................................. 105124387

(51) Int. Cl.
*H02P 9/04* (2006.01)
*H02P 3/12* (2006.01)
(Continued)

(52) U.S. Cl.
CPC ............ *G05B 19/402* (2013.01); *F16C 11/04* (2013.01); *G06F 1/1616* (2013.01);
(Continued)

(58) Field of Classification Search
CPC ............................. E05Y 2600/46; H02P 7/29
See application file for complete search history.

(56) References Cited

U.S. PATENT DOCUMENTS 9,207,616 B2 12/2015 Kumazawa
2008/0172834 A1* 7/2008 Sutterlutti ............. E05F 15/611
16/286
(Continued)

FOREIGN PATENT DOCUMENTS

CN 101615033 A 12/2009
CN 104679014 6/2015
(Continued)

OTHER PUBLICATIONS

Office action dated Feb. 7, 2017 for the Taiwan application No. 105124387, filing date Aug. 2, 2016, p. 2 line 5-26, p. 3-5 and p. 6 line 1-21.

*Primary Examiner* — Eduardo Colon Santana
*Assistant Examiner* — Charles S Laughlin
(74) *Attorney, Agent, or Firm* — Winston Hsu

(57) ABSTRACT

An electronic device has a method capable of automatically executing angle rotation. A second body is rotatably connected to a first body of the electronic device. A hinge mechanism is disposed between the first body and the second body. The hinge mechanism includes a hinge component, a motor unit, a coupling component and an angle detecting unit. The first body and the second body are connected to the hinge component. The motor unit is electrically connected to a controller of the electronic device. The coupling component is connected between the hinge component and the motor unit. The angle detecting unit is connected to the hinge component or the coupling component to read its rotary angle. The controller drives the motor unit to rotate the hinge component via the coupling component, and the second body can be moved relative to the first body and be fixed at a predetermined position.

13 Claims, 17 Drawing Sheets

(51) Int. Cl.
  *G05B 19/402* (2006.01)
  *F16C 11/04* (2006.01)
  *G06F 1/16* (2006.01)
  *G06K 9/00* (2022.01)
  *H04N 7/18* (2006.01)

(52) U.S. Cl.
  CPC .. *G06F 1/1681* (2013.01); *G05B 2219/31308* (2013.01); *G05B 2219/39483* (2013.01); *G06K 9/00288* (2013.01); *H04N 7/183* (2013.01)

(56) References Cited

U.S. PATENT DOCUMENTS

2014/0022714 A1* 1/2014 Huang ................ G06F 1/1679
  361/679.01
2015/0362958 A1 12/2015 Shang
2016/0187934 A1* 6/2016 Lee ..................... G06F 1/1681
  361/679.56

FOREIGN PATENT DOCUMENTS

| | | |
|---|---|---|
| TW | 201111900 A1 | 4/2011 |
| TW | 201223410 | 6/2012 |
| TW | M457156 U1 | 7/2013 |
| TW | 201604428 A | 2/2016 |
| TW | I528143 | 4/2016 |

\* cited by examiner

HINGE MECHANISM, ELECTRONIC DEVICE AND METHOD CAPABLE OF AUTOMATICALLY EXECUTING ANGLE ROTATION

BACKGROUND OF THE INVENTION

1. Field of the Invention

The present disclosure relates to a hinge mechanism and a related electronic device and a related operational method, and more particularly, to a hinge mechanism capable of automatically executing angle rotation and a related electronic device and a related operational method.

2. Description of the Prior Art

A conventional notebook computer includes a screen part and a host part rotatably connected with each other. The screen part is manually folded or unfolded relative to the host part while the user uses the notebook computer, and the conventional manual operation method is complicated. Thus, design of a notebook computer capable of automatically folding and unfolding the screen part to a specific angle is an important issue in the related computer apparatus industry.

SUMMARY OF THE INVENTION

The present disclosure provides a hinge mechanism capable of automatically executing angle rotation and a related electronic device and a related operational method for solving above drawbacks.

According to the claimed disclosure,

According to the claimed disclosure, a hinge mechanism capable of automatically executing angle rotation includes a rotation axle, a first connecting component, a second connecting component, an angle detecting unit and a motor unit. The first connecting component is rotatably connected to the rotation axle. The second connecting component is fixed to the rotation axle. The angle detecting unit is disposed on an end of the rotation axle and adapted to acquire a rotary angle of the rotation axle. The angle detecting unit can be a potentiometer, a gravity sensor or an acceleration sensor. The motor unit is connected to the rotation axle. The motor unit drives rotation of the rotation axle and the second connecting component in accordance with acquired information of the angle detecting unit.

According to the claimed disclosure, the hinge mechanism further includes an axle coupling component connected between the rotation axle and the motor unit. The motor unit drives the rotation of the rotation axle and the second connecting component via the axle coupling component.

According to the claimed disclosure, an annular slot is formed on the rotation axle, the annular slot is sheathed by the first connecting component, and the second connecting component is engaged with the annular slot to be synchronously rotated in accordance with the rotation axle.

According to the claimed disclosure, the rotation axle is a pillar structure having an indentation, an end of the motor unit is a shaft structure having a concave, two ends of the axle coupling component are respectively engaged with the indentation of the rotation axle and the concave of the motor unit.

According to the claimed disclosure, the hinge mechanism further utilizes a fixing component passing through the axle coupling component to assemble with the rotation axle and/or the motor unit.

According to the claimed disclosure, a hinge mechanism capable of automatically executing angle rotation includes at least two rotation axles, a rotating component, a motor unit and an angle detecting unit. The at least two rotation axles are connected with each other in a non-coaxial manner. The rotating component is connected to the at least two rotation axles. The motor unit is connected to the rotating component. The motor unit drives the rotating component to rotate relative to one of the at least two rotation axles, so as to rotate the other rotation axle of the at least two rotation axles around the one of the rotation axles via the rotating component. The angle detecting unit is connected to the motor unit or the rotating component and adapted to acquire a rotary angle of the rotating component generated by the motor unit.

According to the claimed disclosure, the hinge mechanism further includes a transmission gear set engaged between the at least two rotation axles. The rotating component pushes the other rotation axle and drives the other rotation axle to rotate around the one of the rotation axles via the transmission gear set.

According to the claimed disclosure, the hinge mechanism further includes a bridging component, and the angle detecting unit is connected to the rotating component via the bridging component. The bridging component is a gear set or a transmission belt set.

According to the claimed disclosure, the bridging component utilizes a bridging gear to engage with a toothed structure of the rotating component.

According to the claimed disclosure, the hinge mechanism further includes an axle coupling component connected between the motor unit and the rotating component, and the motor unit drives the axle coupling component to guide rotation of the rotating component.

According to the claimed disclosure, the bridging component utilizes a bridging gear to engage with a toothed structure of the axle coupling component.

According to the claimed disclosure, the rotating component includes a base portion and a stretching portion, the base portion is fixed to the axle coupling component and connected to the one of the rotation axles in a loose fit manner, an end of the stretching portion is connected to the base portion and the other end of the stretching portion is fixed to the other rotation axle.

According to the claimed disclosure, a locking hole is formed on the axle coupling component, the rotating component further includes a fixing component, and the fixing component passes through the base portion and the locking hole to assemble with the rotating component and the axle coupling component.

According to the claimed disclosure, the one of the rotation axles is static while the rotating component is rotated by the axle coupling component.

According to the claimed disclosure, the hinge mechanism further includes at least one twisting component, two ends of the at least one twisting component are respectively disposed on the at least two rotation axles, or the at least one twisting component is disposed on at least one of the at least two rotation axles.

According to the claimed disclosure, the motor unit is connected to the rotating component via the bridging component.

According to the claimed disclosure, an electronic device capable of automatically executing angle rotation includes a first body, a second body and a hinge mechanism. The first body has a controller. The second body is rotatably connected to the first body. The hinge mechanism is disposed between the first body and the second body. The hinge mechanism includes a hinge component, a motor unit and an angle detecting unit. Two parts of the hinge component are respectively connected to the first body and the second body. The motor unit is electrically connected with the controller to drive the hinge component. The angle detecting unit is linked to the hinge component or the motor unit to acquire its rotary angle. The controller drives the motor unit to guide rotation of the second body relative to the first body by the hinge component in accordance with acquired information of the angle detecting unit while a specific condition is achieved, so as to position the second body at a predetermined angle.

According to the claimed disclosure, the hinge component includes a rotation axle, a first connecting component and a second connecting component. The angle detecting unit is disposed on an end of the rotation axle to acquire a rotary angle of the rotation axle. The first connecting component is rotatably disposed on the rotation axle and further connected to the first body. The second connecting component is fixed to the rotation axle and connected to the second body.

According to the claimed disclosure, the hinge component further includes an axle coupling component connected between the rotation axle and the motor unit, and the motor unit drives rotation of the rotation axle and the second connecting component via the axle coupling component.

According to the claimed disclosure, the hinge component includes at least two rotation axles and a rotating component. The at least two rotation axles are connected with each other in a non-coaxial manner. One of the at least two rotation axles is connected to the first body by a first connecting component, and the other rotation axle of the at least two rotation axles is connected to the second body by a second connecting component. The rotating component is connected to the at least two rotation axles. The motor unit is connected to the rotating component, and the motor unit drives the rotating component to rotate relative to the one of the rotation axles, so as to utilize the rotating component to rotate the other rotation axle around the one of the rotation axles.

According to the claimed disclosure, the bridging component utilizes a bridging gear to engage with a toothed structure of the rotating component. Or, the electronic device further includes an axle coupling component connected between the motor unit and the rotating component, and the motor unit drives the axle coupling component to guide rotation of the rotating component. The bridging component utilizes a bridging gear to engage with a toothed structure of the axle coupling component.

According to the claimed disclosure, a method capable of automatically executing angle rotation is disclosed. The method is applied to an electronic device having a first body, a second body and a hinge mechanism, and the second body is rotatably connected to the first body via the hinge mechanism. The method includes steps of utilizing an axle coupling component of the hinge mechanism to acquire an included angle of the second body relative to the first body, a controller of the electronic device comparing whether the included angle conforms to a threshold range, and the controller determining whether to utilize a motor unit of the hinge mechanism to rotate the second body relative to the first body in forward rotation or in backward rotation according to a comparison result.

According to the claimed disclosure, the method further includes a step of the controller determining whether another included angle of the second body relative to the first body conforms to the threshold range since the second body is rotated, so as to decide whether the motor unit is driven to rotate the second body.

According to the claimed disclosure, the controller utilizes a camera of the electronic device to execute human face identification procedure, to analyze whether a human face pattern inside a capturing image captured by the camera is located at a predetermined position, so as to determine whether the motor unit is driven to rotate the second body.

The present disclosure utilizes the angle detecting unit to detect the included angle of the screen relative to the host of the electronic device. The hinge mechanism can automatically rotate the screen to the predetermined angle (which can be set by the user) while the included angle is larger than or smaller than the predetermined value or the predetermined range. The hinge mechanism can be a uniaxial hinge design, the motor unit directly utilizes the rotation axle to rotate the screen relative to the host; further, the hinge mechanism can be a biaxial hinge design, the motor unit drives rotation of the rotating component, the rotating component does not move the first rotation axle while being rotated (which means the rotating component is idling), and the rotating component still can encircle the second rotation axle around the first rotation axle to rotate the screen relative to the host.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
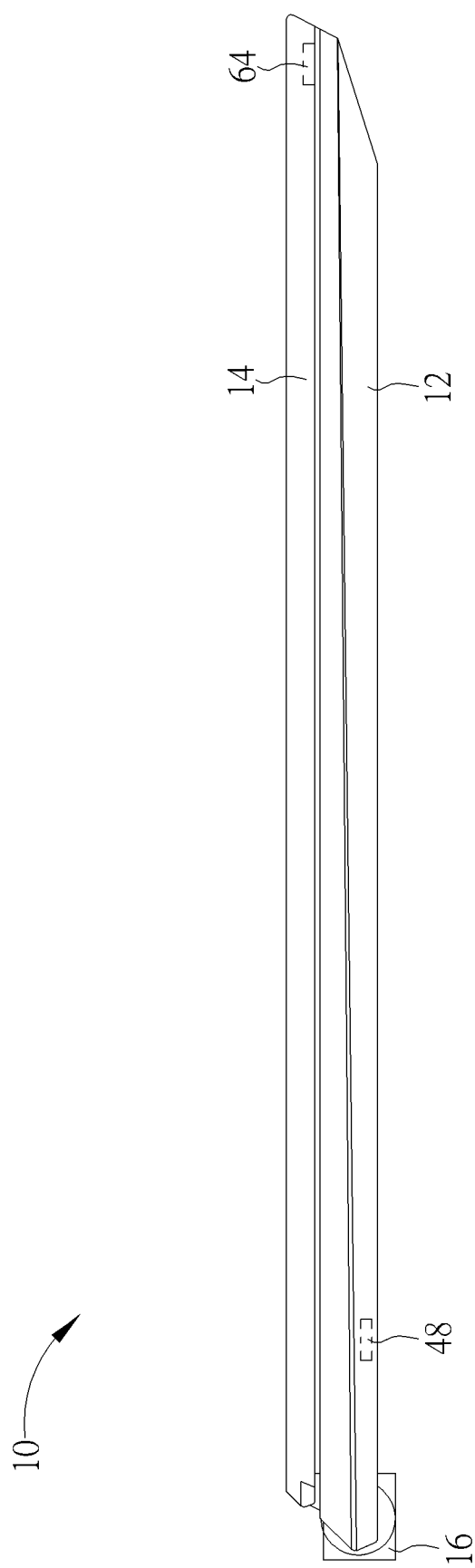
FIG. 1 and FIG. 2 respectively are diagrams of an electronic device in different operation modes according to an embodiment of the present disclosure.
Figure 2:
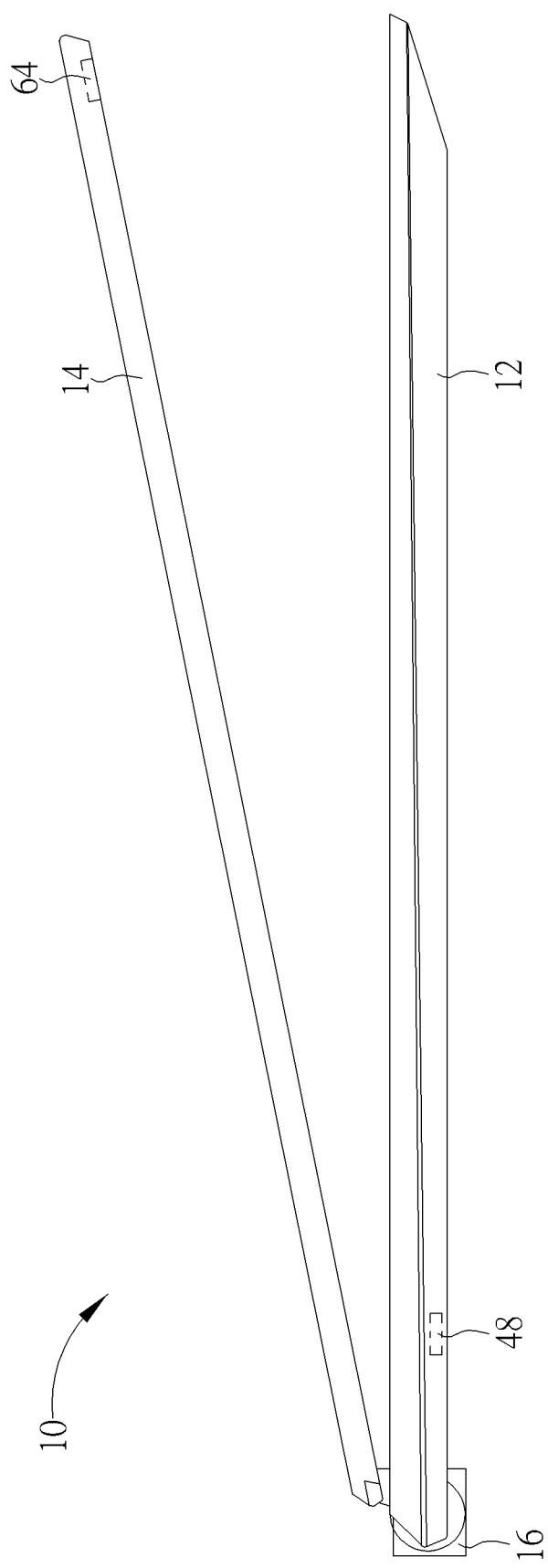
Figure 3:
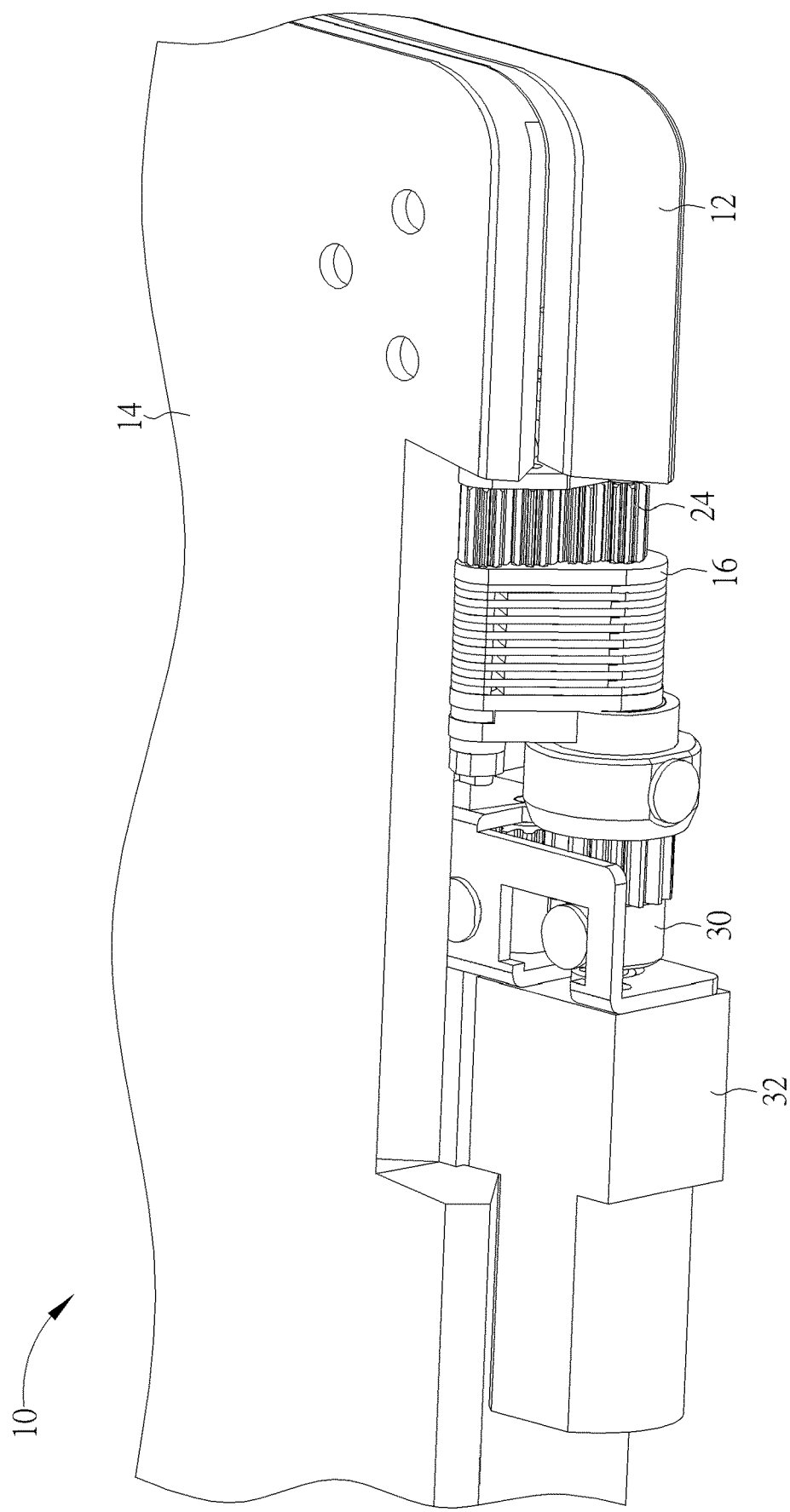
FIG. 3 is a partial diagram of the electronic device in another view according to the embodiment of the present disclosure.

Please refer to FIG. 1 to FIG. 3. FIG. 1 and FIG. 2 respectively are diagrams of an electronic device 10 in different operation modes according to an embodiment of the present disclosure. FIG. 3 is a partial diagram of the electronic device 10 in another view according to the embodiment of the present disclosure. The electronic device 10 includes a first body 12, a second body 14 and a hinge mechanism 16. The electronic device 10 can be a notebook computer, and the first body 12 is the host and the second body 14 is the display accordingly. The hinge mechanism 16 is disposed between the first body 12 and the second body 14, and the second body 14 can be rotatably connected to the first body 12 via the hinge mechanism 16. In the embodiment of the present disclosure, the hinge mechanism 16 is the biaxial mechanism; while the second body 14 is rotated relative to the first body 12, a side of the second body 14 adjacent to the first body 12 is moved around a related side of the first body 12 to avoid structural interference, as shown in FIG. 2. A style of the hinge mechanism is not limited to the above mentioned embodiment.

Figure 4:
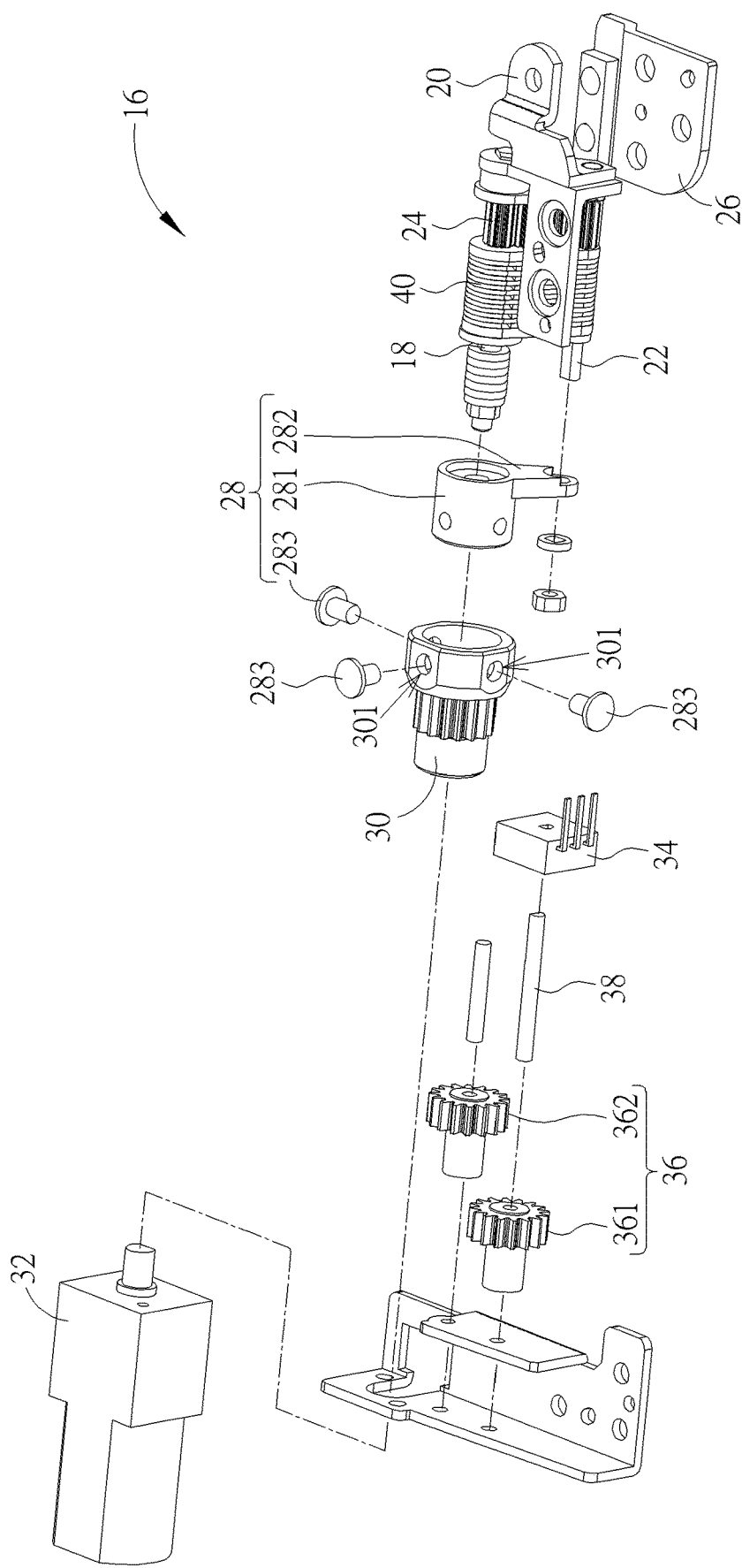
FIG. 4 is an exploded diagram of a hinge mechanism according to a first embodiment of the present disclosure.
Figure 5:
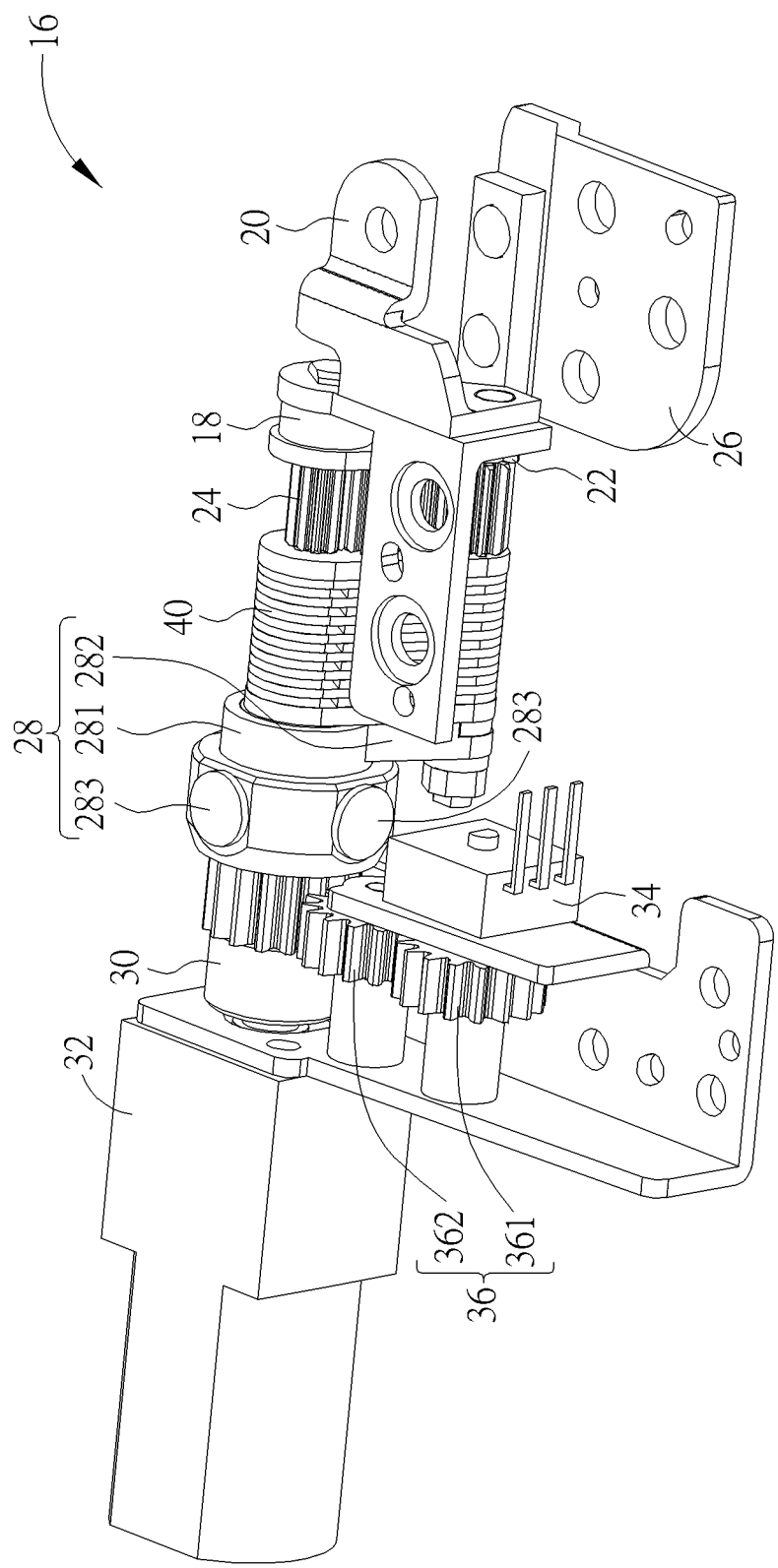
FIG. 5 and FIG. 6 respectively are assembly diagrams of the hinge mechanism in different views according to the first embodiment of the present disclosure.
Figure 6:
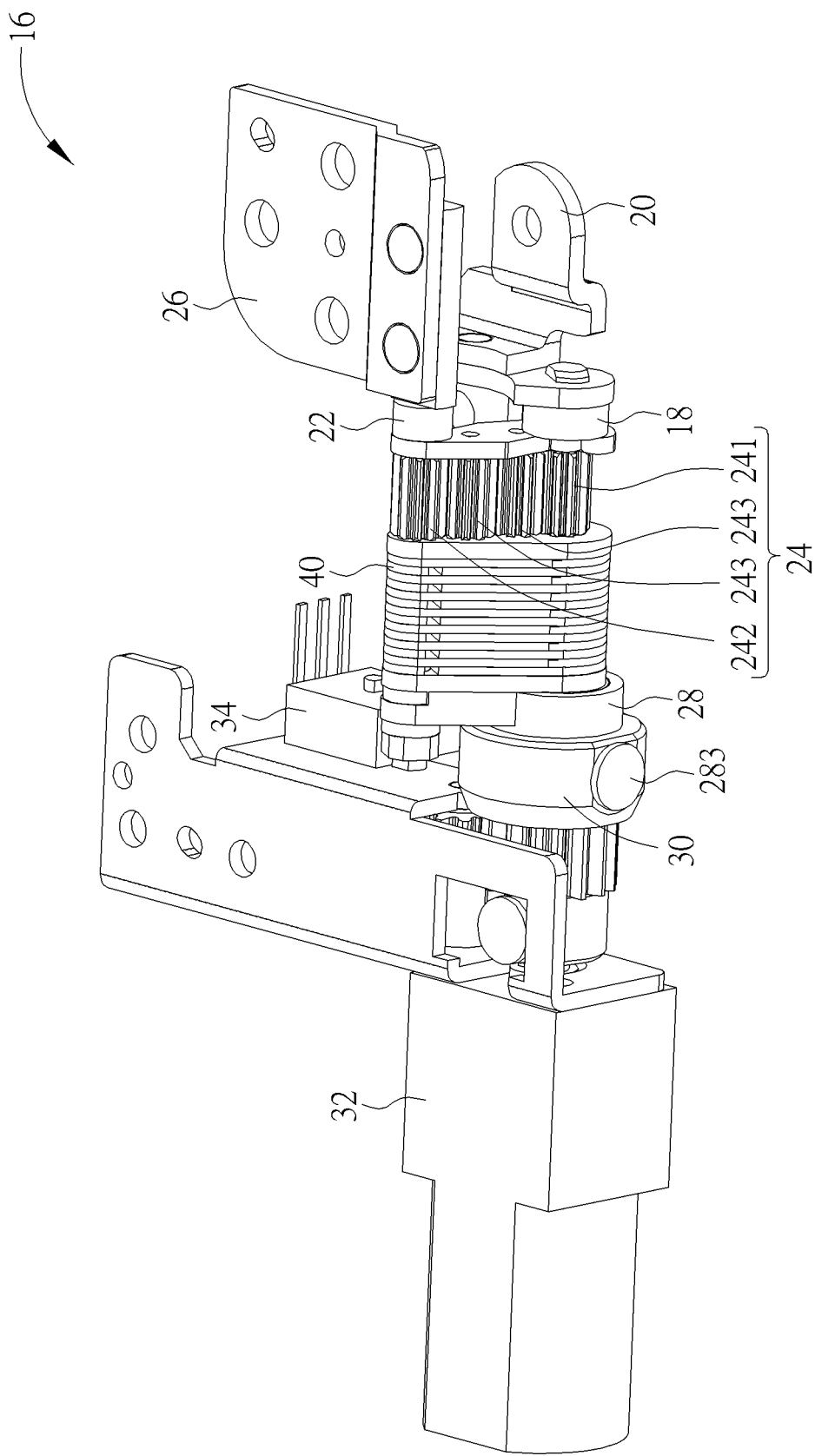

Please refer to FIG. 4 to FIG. 6. FIG. 4 is an exploded diagram of the hinge mechanism 16 according to a first embodiment of the present disclosure. FIG. 5 and FIG. 6 respectively are assembly diagrams of the hinge mechanism 16 in different views according to the first embodiment of the present disclosure. A first rotation axle 18 (which is represented as one of at least two rotation axles) of the hinge mechanism 16 is connected to the first body 12 via a first connecting component 20, a second rotation axle 22 (which is represented as the other rotation axle of the at least two rotation axles) is connected to the first rotation axle 18 in a non-coaxial manner; for example, the second rotation axle 22 can be linked with the first rotation axle 18 by a transmission gear set 24 located between the first rotation axle 18 and the second rotation axle 22, and the second rotation axle 22 is connected to the second body 14 via the second connecting component 26. A first main gear 241 of the transmission gear set 24 is disposed on the first rotation axle 18, a second main gear 242 of the transmission gear set 24 is disposed on the second rotation axle 22, and two sub gears 243 are engaged between the first main gear 241 and the second main gear 242, so that the second body 14 can be inversely and synchronously rotated relative to the first body 12.

A rotating component 28 of the hinge mechanism 16 is connected to the first rotation axle 18 and the second rotation axle 22. An axle coupling component 30 of the hinge mechanism 16 is connected between the motor unit 32 and the rotating component 28. The first rotation axle 18, the second rotation axle 22 and the rotating component 28 are parts of a hinge component of the hinge mechanism 16. The rotating component 28 includes a base portion 281 and a stretching portion 282. The base portion 281 is similar to a tube-typed structure, and the stretching portion 282 is similar to a plank-typed structure. The base portion 281 is fixed to the axle coupling component 30 and connected to the first rotation axle 18 in a loose fit manner. The rotating component 28 utilizes a fixing component 283 to pass through the locking hole 301 of the axle coupling component 30 and the base portion 281, so as to lock the rotating component 28 and the axle coupling component 30 for synchronous motion. An end of the stretching portion 282 is connected to the base portion 281, and the other end of the stretching portion 282 is connected to the second rotation axle 22. An angle detecting unit 34 of the hinge mechanism 16 is connected to the axle coupling component 30 via the bridging component 36. In the embodiment, the bridging component 36 can be a gear set including two bridging gears, the bridging gear 361 is connected to the angle detecting unit 34 via the axle 38, the bridging gear 362 is engaged between the bridging gear 361 and a toothed structure of the axle coupling component 30, so the angle detecting unit 34 can synchronously acquire a rotary angle of the axle coupling component 30.

Figure 7:
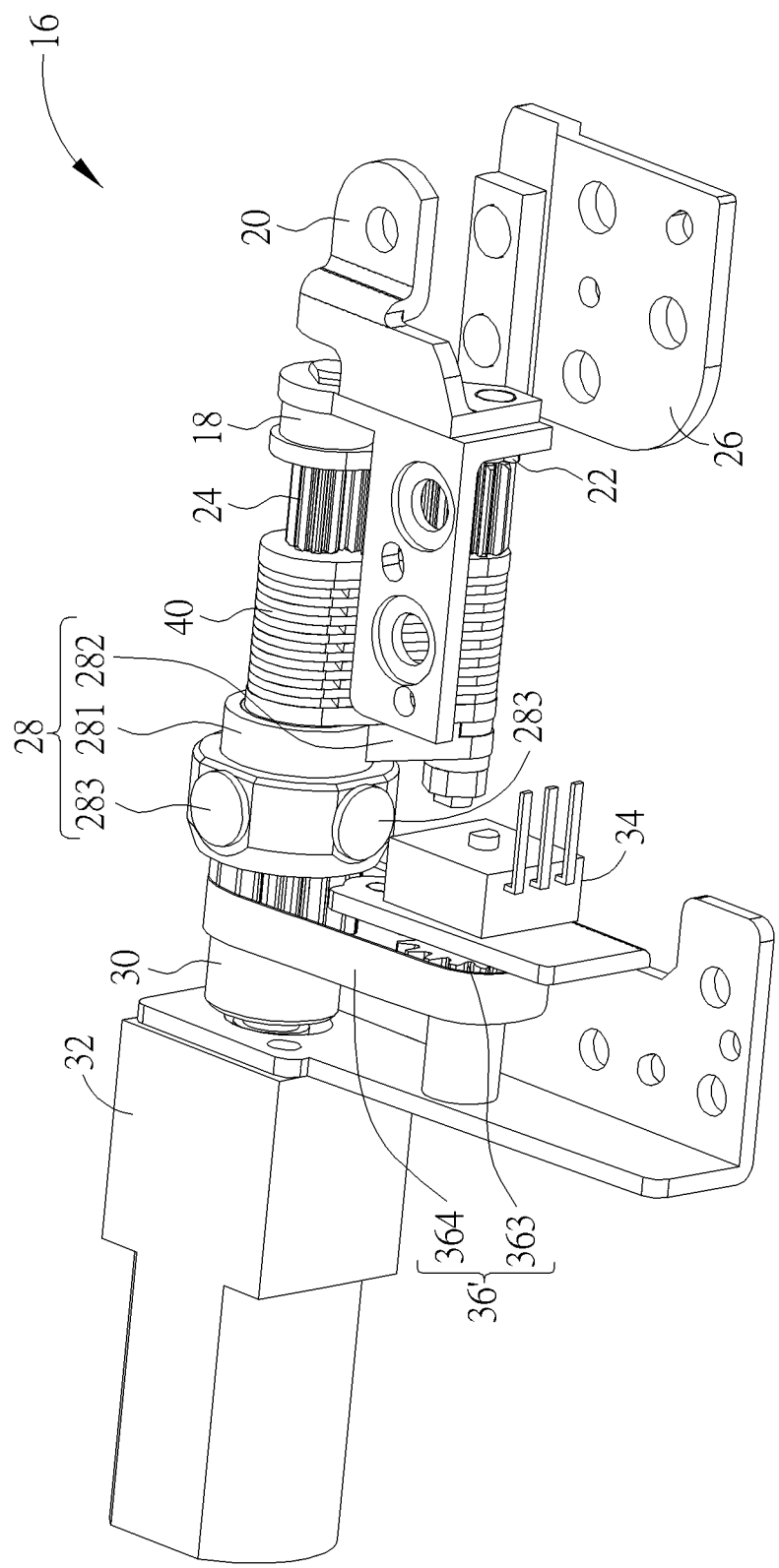
FIG. 7 is a diagram of a bridging component according to another embodiment of the present disclosure.

The bridging component further can be a transmission belt set. Please refer to FIG. 7. FIG. 7 is a diagram of the bridging component 36' according to another embodiment of the present disclosure. The bridging component 36' can include a bridging gear 363 and a transmission belt 364. The bridging gear 363 is connected to the angle detecting unit 34 via the axle 38. The transmission belt 364 is disposed on the bridging gear 363 and the toothed structure of the axle coupling component 30, the angle detecting unit 34 can synchronously acquire the rotary angle of the axle coupling component 30 via the transmission belt 364 of the bridging component 36'.

Figure 8:
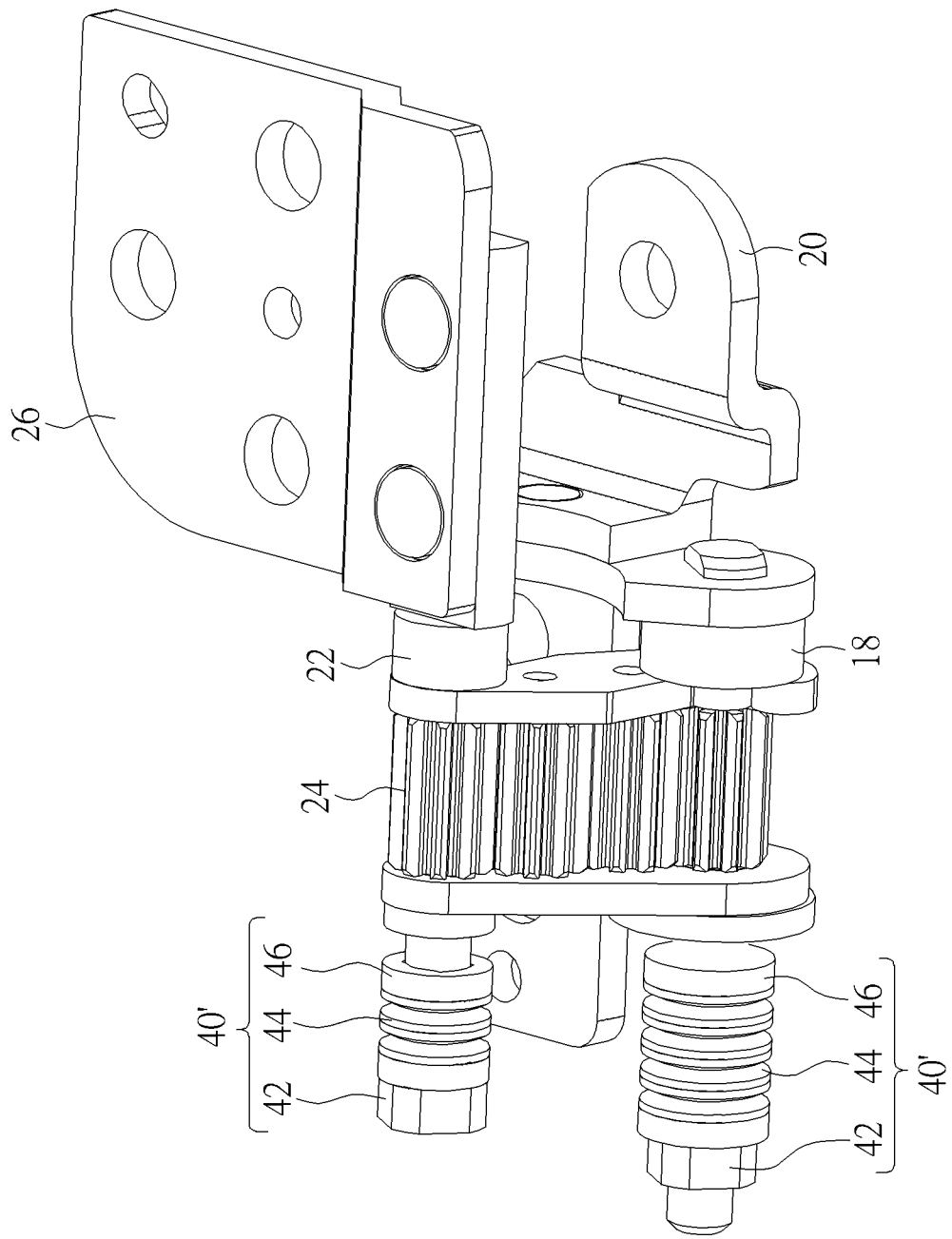
FIG. 8 is a diagram of a twisting component according to another embodiment of the present disclosure.
Figure 9:
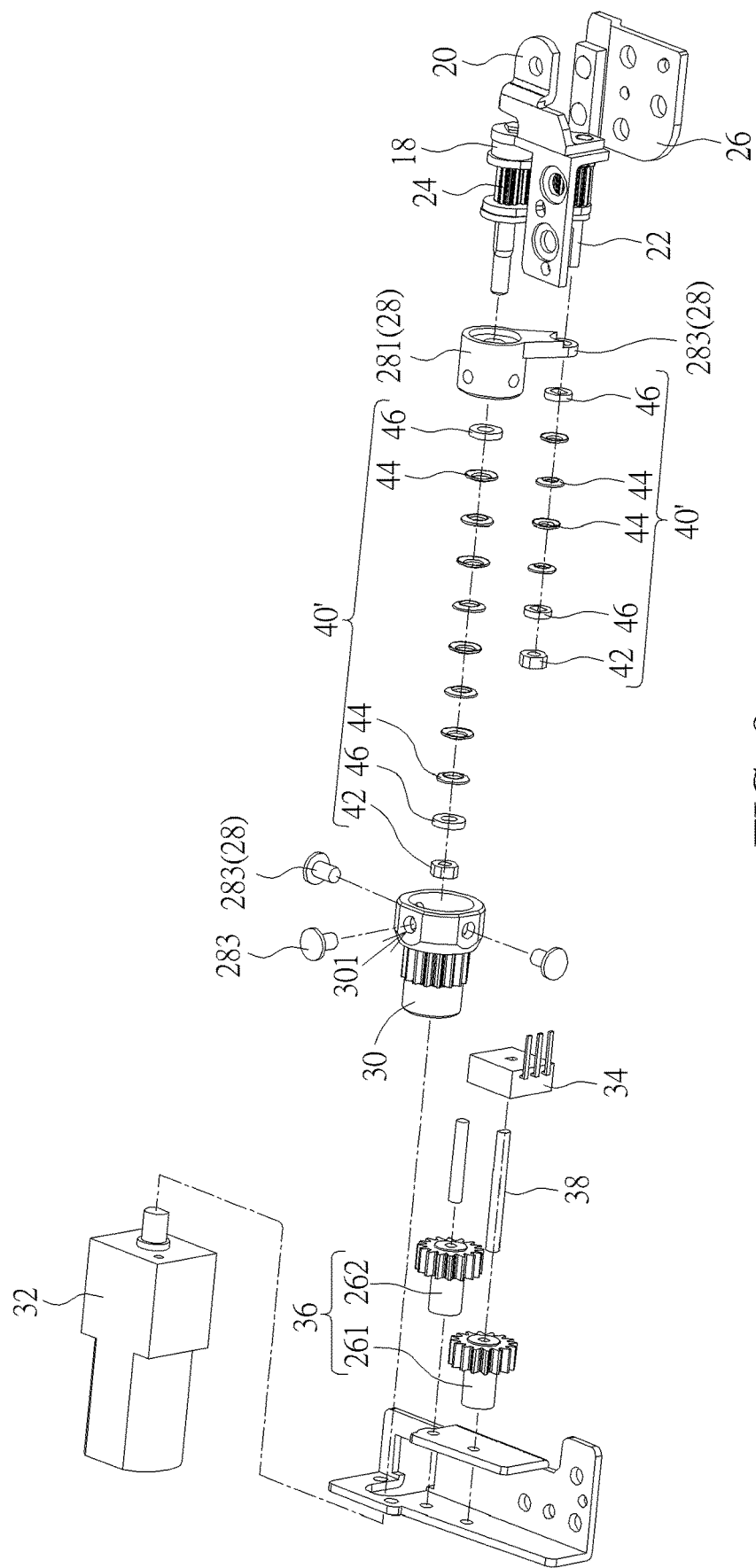
FIG. 9 is an exploded diagram of the twisting component, a rotating component, an axle coupling component, a motor unit and an angle detecting unit shown in FIG. 8.

As shown in FIG. 4 and FIG. 5, the hinge mechanism 16 further disposes two ends of the twisting component 40 respectively on the first rotation axle 18 and the second rotation axle 22. Torsion of the hinge mechanism 16 is derived from friction generated by the twisting component 40 rotated relative to the first rotation axle 18 and the second rotation axle 22. The twisting component 40 is located between the first rotation axle 18 and the second rotation axle 22, so that the first rotation axle 18 is far distant from the second rotation axle 22. Design of the twisting component 40 is not limited to the above-mentioned embodiment, which depends on actual demand. Please refer to FIG. 8 and FIG. 9. FIG. 8 is a diagram of the twisting component 40' according to another embodiment of the present disclosure. FIG. 9 is an exploded diagram of the twisting component 40', the rotating component 28, the axle coupling component 30, the motor unit 32 and the angle detecting unit 34 shown in FIG. 8. The twisting component 40' can be disposed on the first rotation axle 18 and/or the second rotation axle 22. For example, a nut unit 42 of the twisting component 40' can be locked on the first rotation axle 18, a resilient component 44 is compressed by the nut unit 42, so that a gasket 46 and the first rotation axle 18 are pressed accordingly to generate the friction. As the embodiment shown in FIG. 8 and FIG. 9, the twisting component 40' is disposed on an axle center of the first rotation axle 18 and/or an axle center of the second rotation axle 22, the first rotation axle 18 can be near to the second rotation axle 22 to minimize dimensions of the hinge mechanism 16.

Figure 13:
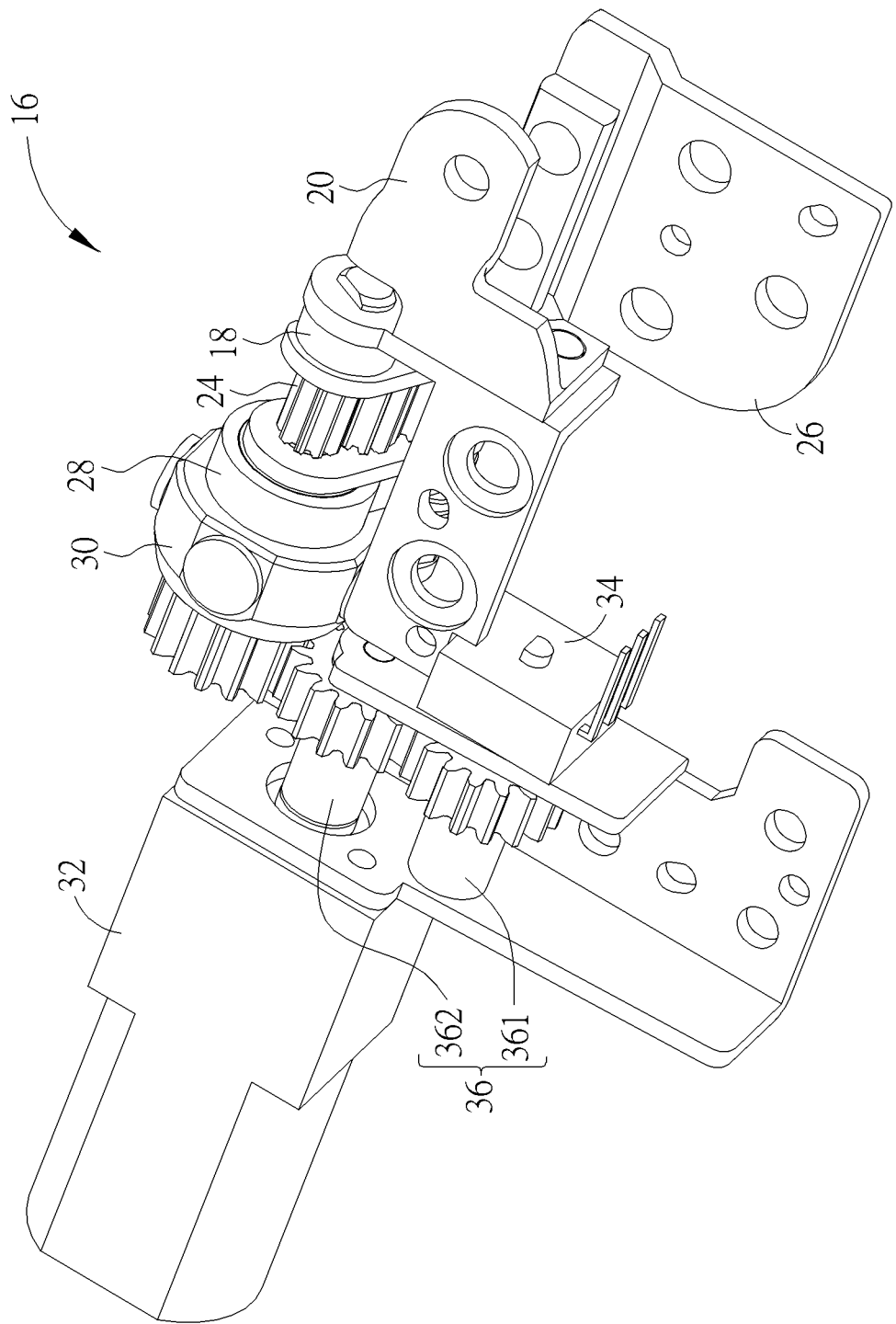
FIG. 13 and FIG. 14 respectively are assembly diagrams of the hinge mechanism in another type according to the first embodiment of the present invention.
Figure 14:
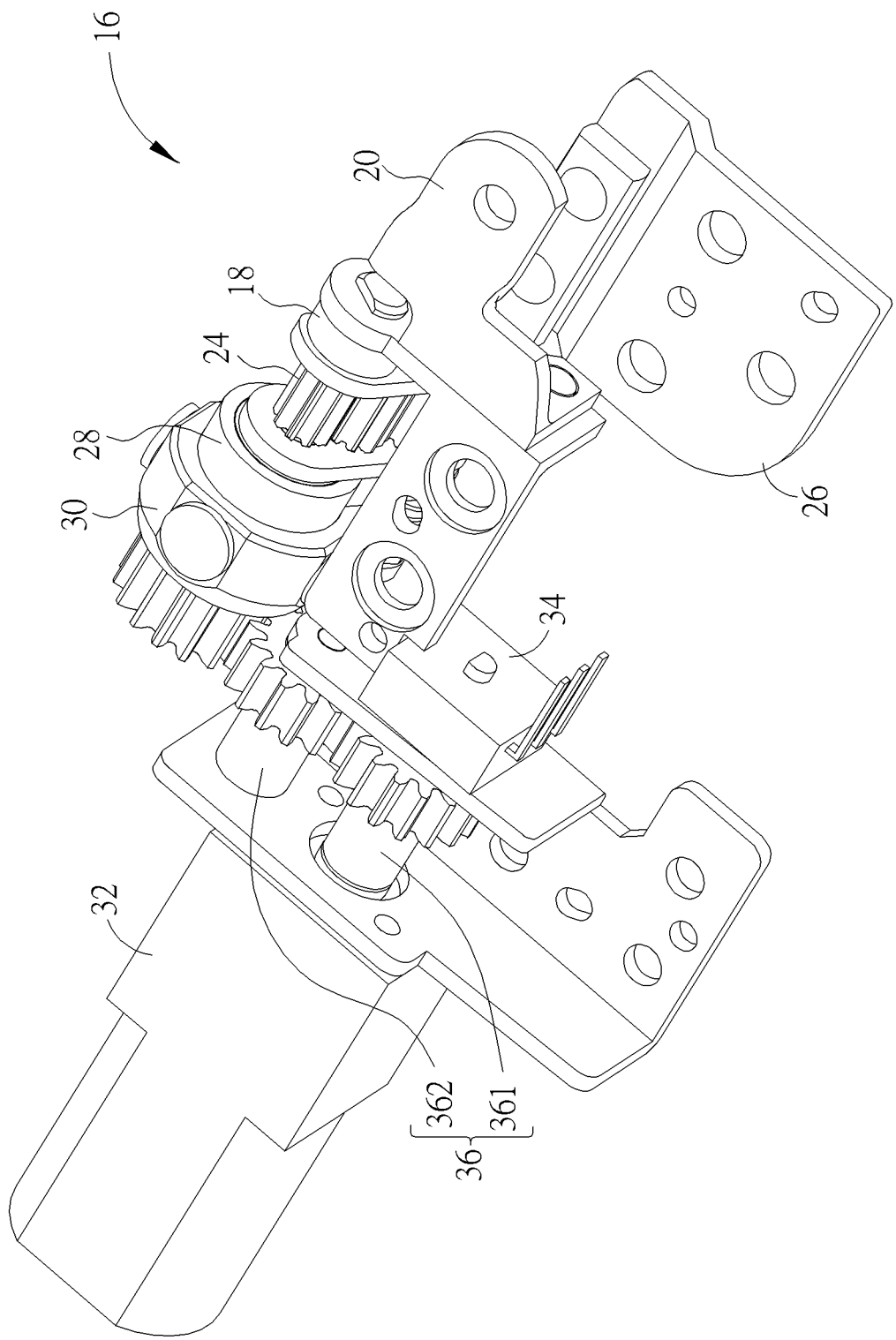

Please refer to FIG. 13 and FIG. 14. FIG. 13 and FIG. 14 respectively are assembly diagrams of the hinge mechanism 16 in another type according to the first embodiment of the present invention. The motor unit 32 of the above-mentioned embodiment is directly connected to the axle coupling component 30 for driving the rotating component 28; however in the other possible embodiment, as shown in FIG. 13, the motor unit 32 can be connected to the bridging gear 362 of the bridging component 36. Because the bridging gear 362 is engaged between the bridging gear 361 and the toothed structure of the axle coupling component 30, the motor unit 32 drives the bridging gear 362, the bridging gear 362 can synchronously guide the bridging gear 361 and the axle coupling component 30, and the angle detecting unit 34 connected to the bridging gear 361 can immediately detect the rotary angle of the axle coupling component 30 and the rotating component 28. As shown in FIG. 14, the motor unit 32 can be connected to the bridging gear 361 of the bridging component 36, and the angle detecting unit 34 can directly detect the rotary angle of the bridging gear 361 driven by the motor unit 32. The bridging gear 361 can be utilized to drive the axle coupling component 30 and the rotating component 28 via the bridging gear 362, so the angle detecting unit 34 can indirectly acquire the rotary angle of the axle coupling component 30 and the rotating component 28.

Figure 15:
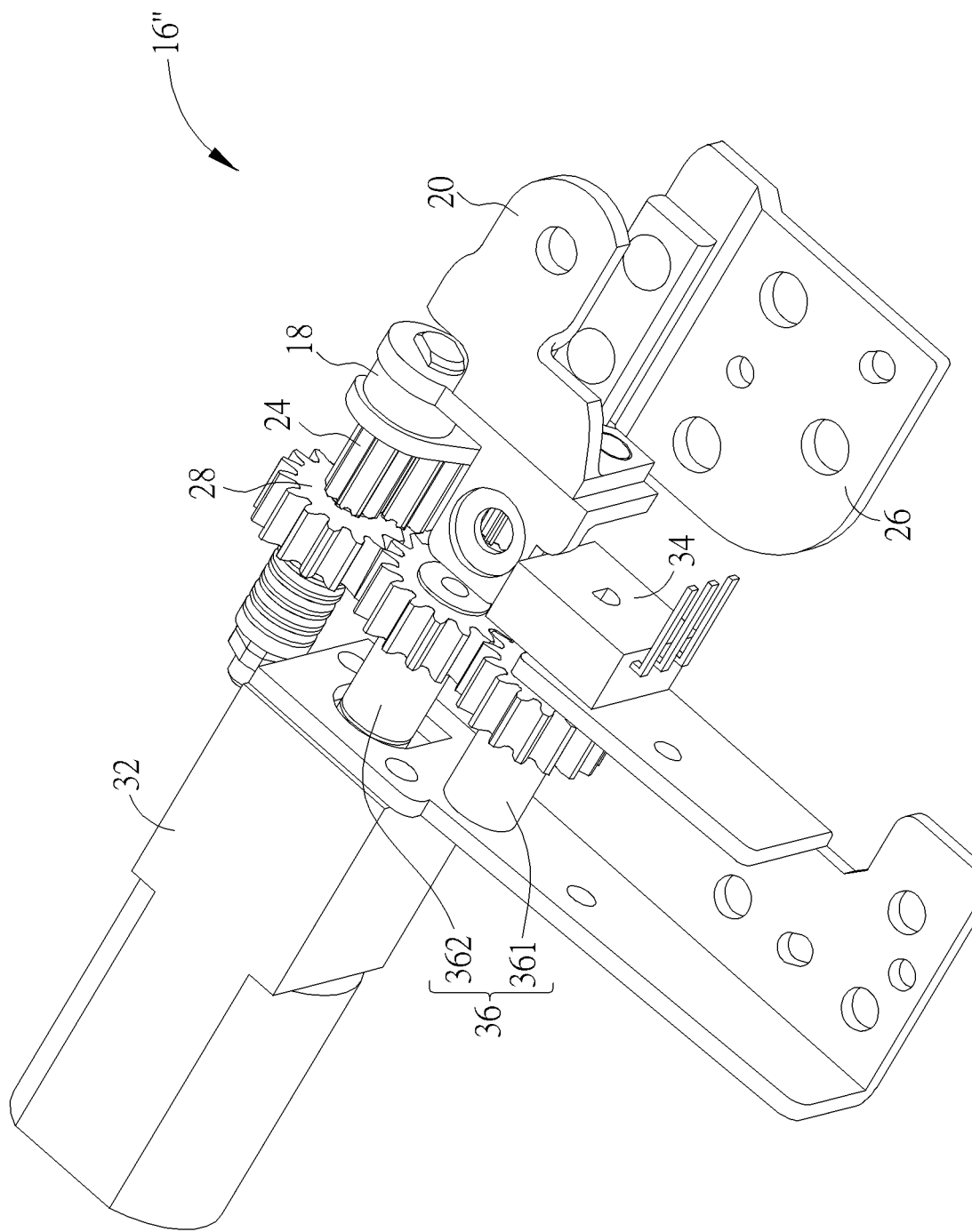
FIG. 15 and FIG. 16 respectively are assembly diagrams of the hinge mechanism in different views according to another embodiment of the present invention.
Figure 16:
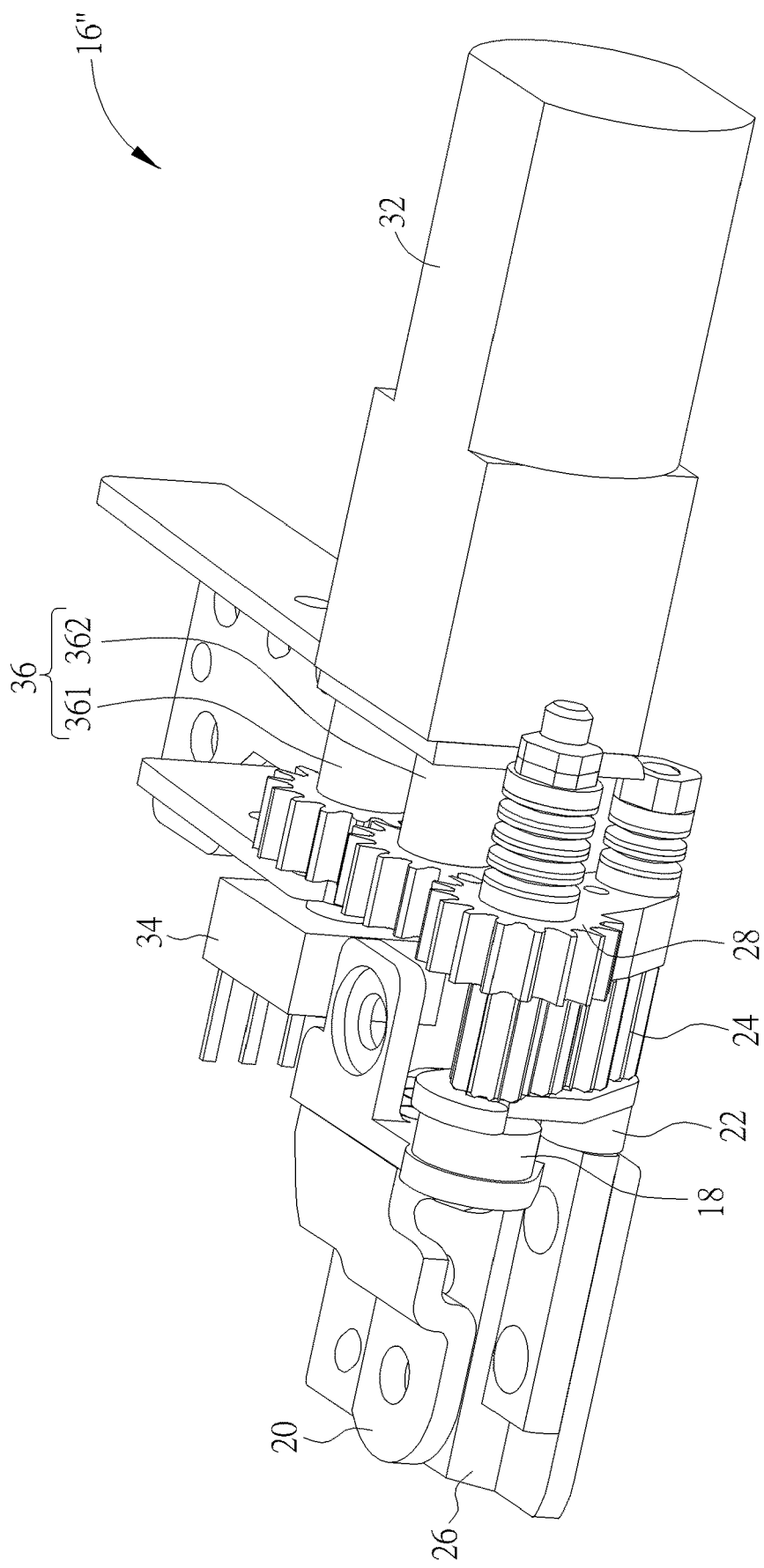

Please refer to FIG. 15 and FIG. 16. FIG. 15 and FIG. 16 respectively are assembly diagrams of the hinge mechanism 16" in different views according to another embodiment of the present invention. In this embodiment, the hinge mechanism 16" does not have design of the axle coupling component; the motor unit 32 is connected to the bridging gear 361 or the bridging gear 362 of the bridging component 36, the bridging gear 362 is directly engaged with the toothed structure of the rotating component 28, and dimensions of the hinge mechanism 16" can be effectively minimized for the thin-typed notebook computer. As shown in FIG. 15 and FIG. 16, the motor unit 32 drives the rotating component 28 to rotate via the first rotation axle 18 (which is used as an axle center) merely through the bridging component 36, so as to encircle the second rotation axle 22 around the first rotation axle 18.

The angle detecting unit 34 can be a potentiometer, a gravity sensor or an acceleration sensor. The second body 14 is rotated relative to the first body 12, and rotation information of the second rotation axle 22 is transmitted to the angle detecting unit 34 via the rotating component 28, the axle coupling component 30 and the bridging component 36. While the rotation information is transmitted to the angle detecting unit 34 by the bridging component 36, the angle detecting unit 34 generates a corresponding voltage value (which can be transformed into the rotary angle of the axle coupling component 30), a controller 48 of the electronic device 10 analyzes the voltage value to acquire an included angle between the second body 14 and the first body 12, and the included angle can be displayed on the screen of the second body 14 or be utilized to actuate a specific application program (such as a procedure of automatically executing angle rotation) of the electronic device 10.

Several screen folding/unfolding parameters, such like the common used included angle of the second body 14 relative to the first body 12, can be pre-set for the electronic device 10 by the user. While the electronic device 10 is activated, the controller 48 electrically connected to the hinge mechanism 16 is utilized to acquire the voltage value generated by the angle detecting unit 34, so as to ensure the initial folding/unfolding angle of the screen. Then, the controller 48 determines whether the initial folding/unfolding angle conforms to a threshold range (the predetermined screen folding/unfolding parameters). Since the initial folding/unfolding angle conforms to the threshold range, the angle of the second body 14 is correct and the hinge mechanism 16 is static; since initial folding/unfolding angle does not conform to the threshold range, the angle of the second body 14 is not equal to an expected value and the controller 48 drives the motor unit 32 to rotate the axle coupling component 30 and the rotating component 28. While the rotating component 28 is rotated relative to the first rotation axle 18, the first rotation axle 18 is stayed at a stationary condition because the base portion 281 is disposed on the first rotation axle 18 in a loose fit manner; the rotating component 28 pushes the second rotation axle 22, and the second rotation axle 22 is encircled around the first rotation axle 18 via the transmission gear set 24. The second rotation axle 22 is folded and unfolded relative to the first rotation axle 18 by encirclement of the second body 14 and the first body 12. The controller 48 analyzes data from the angle detecting unit 34 to confirm that the second body 14 is rotated to the predetermined angle, then the hinge mechanism 16 is stopped and the second body 14 can be located at the predetermined angle.

Figure 10:
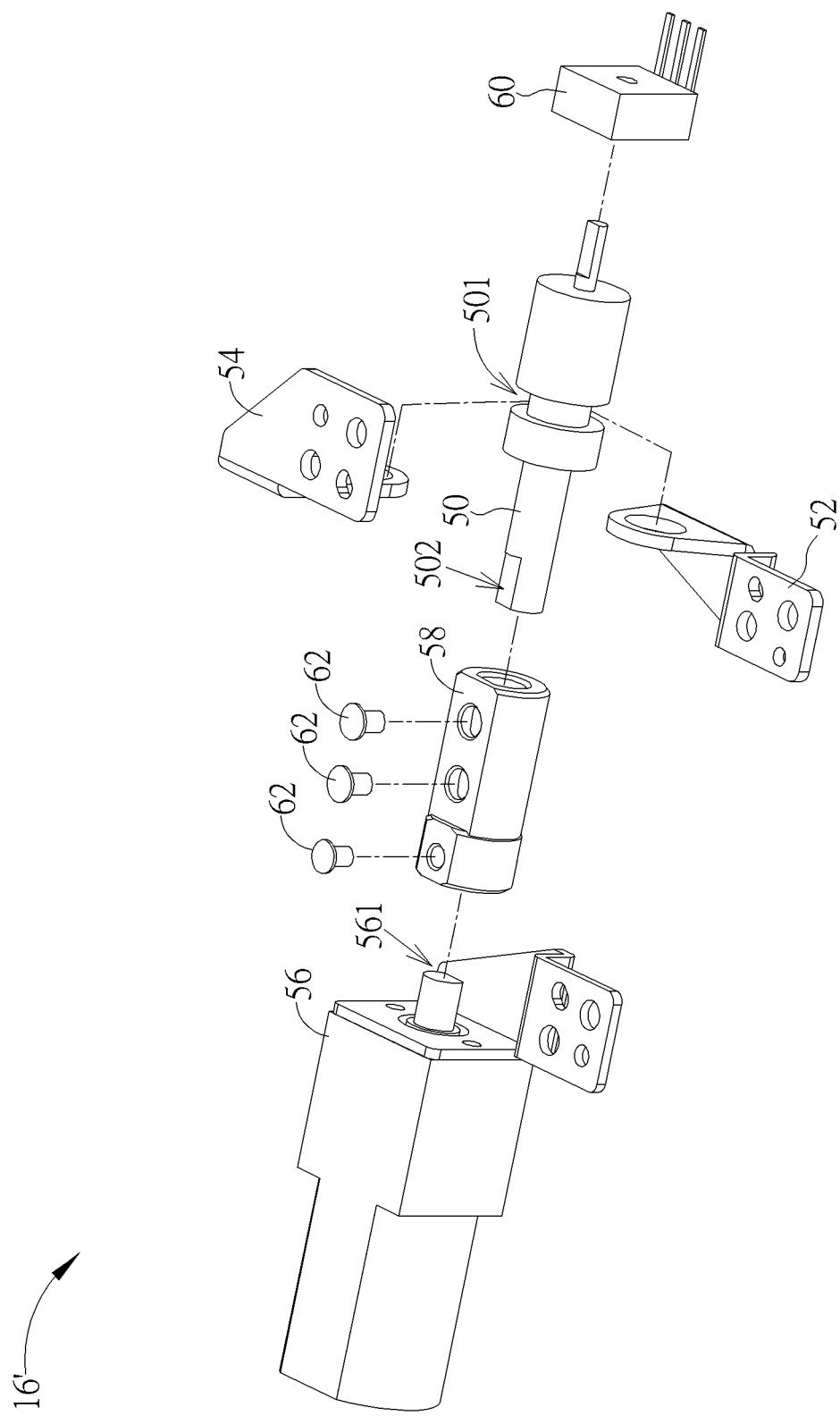
FIG. 10 is an exploded diagram of the hinge mechanism according to a second embodiment of the present disclosure.
Figure 11:
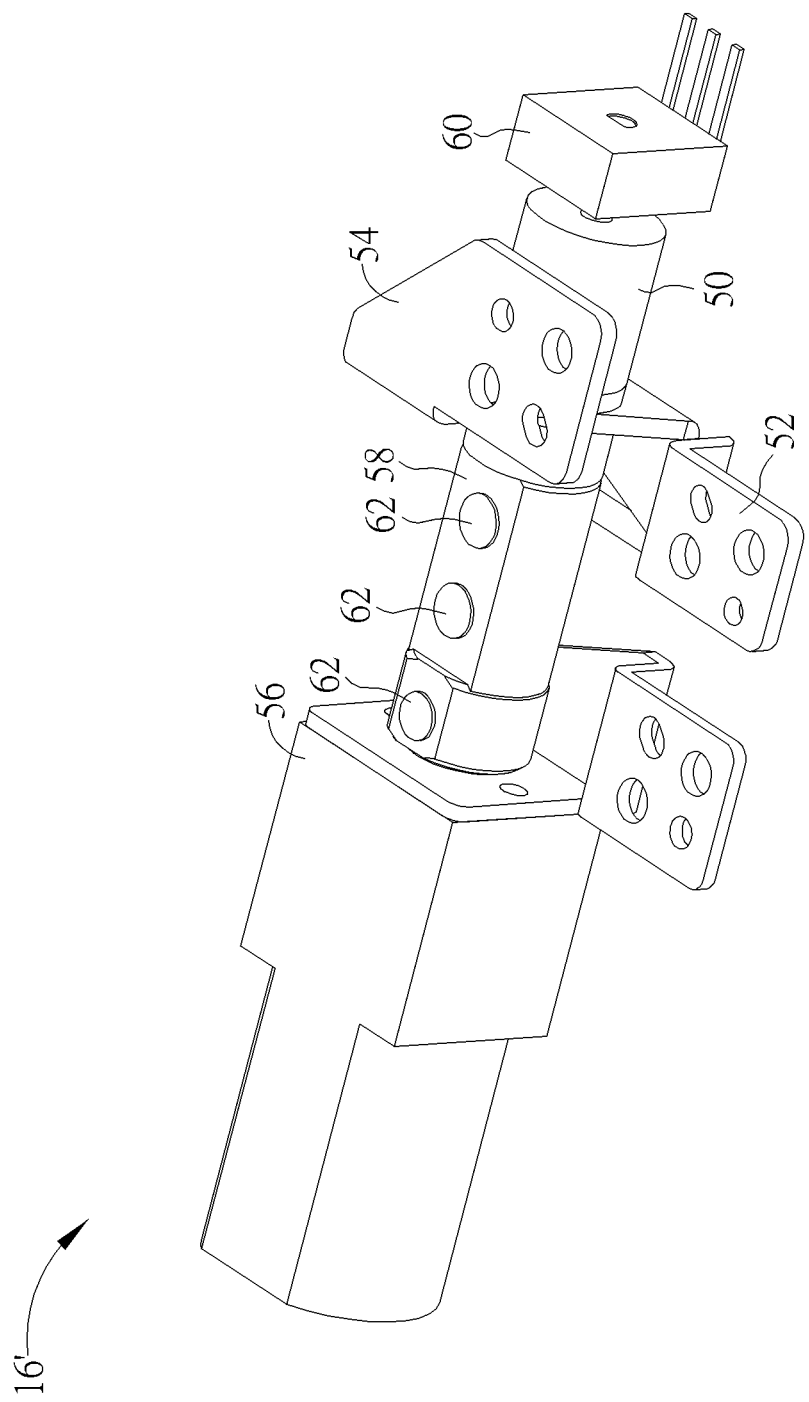
FIG. 11 is an assembly diagram of the hinge mechanism according to the second embodiment of the present disclosure.

Please refer to FIG. 10 and FIG. 11. FIG. 10 is an exploded diagram of the hinge mechanism 16' according to a second embodiment of the present disclosure. FIG. 11 is an assembly diagram of the hinge mechanism 16' according to the second embodiment of the present disclosure. The hinge mechanism 16' includes a rotation axle 50, a first connecting component 52, a second connecting component 54, a motor unit 56, an axle coupling component 58 and an angle detecting unit 60. The rotation axle 50, the first connecting component 52 and the second connecting component 54 can be parts of the hinge component of the hinge mechanism 16'. The angle detecting unit 60 is disposed on an end of the rotation axle 50 to acquire the rotary angle. An annular slot 501 is formed on the rotation axle 50. The annular slot 501 is sheathed by the first connecting component 52 and the first connecting component 52 can be rotated with the rotation axle 50. The first connecting component 52 can be disposed on the annular slot 501 in a tight fit manner; however an assembly application of the first connecting component 52 and the annular slot 501 is not limited to the above-mentioned embodiment. The second connecting component 54 is fixed to the annular slot 501 and synchronously rotated with the rotation axle 50. The first connecting component 52 is connected to the first body 12, and the second connecting component 54 is connected to the second body 14 of the electronic device 10. The axle coupling component 58 is connected between the rotation axle 50 and the motor unit 56.

It should be mentioned that the rotation axle 50 can be a pillar structure (such as the cylinder or the polygon column) having an indentation 502, the motor unit 56 includes a shaft structure having a concave 561. Shapes of two ends of the axle coupling component 58 are designed accordingly to engage with the indentation 502 of the rotation axle 50 and the concave 561 of the motor unit 56. Otherwise, the hinge mechanism 16' further can utilize a fixing component 62 to pass through the axle coupling component 58 and to lock onto the rotation axle 50, or to pass through the axle coupling component 58 to lock onto the shaft structure of the motor unit 56.

Figure 17:
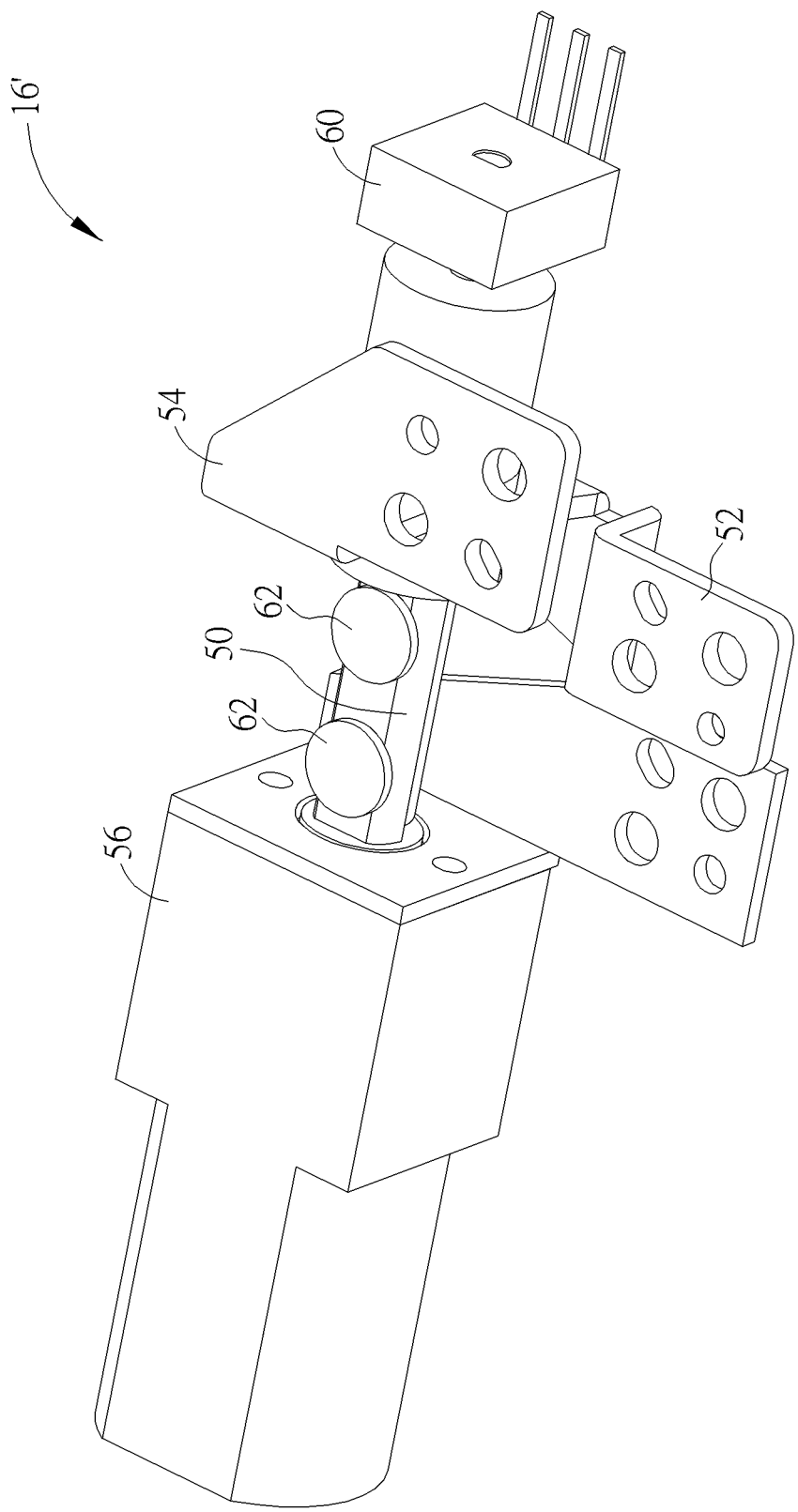
FIG. 17 is an assembly diagram of the hinge mechanism in another type according to the second embodiment of the present disclosure.

Please refer to FIG. 17. FIG. 17 is an assembly diagram of the hinge mechanism 16' in another type according to the second embodiment of the present disclosure. The hinge mechanism 16' in this specific type does not have design of the axle coupling component. The motor unit 56 can be assembled with the rotation axle 50 via the fixing component 62, which means the rotation axle 50 is rotated and driven directly by the motor unit 56. The hinge mechanism 16' has no axle coupling component can provide minimal structural dimensions for the specific thin-typed notebook computer.

In the second embodiment, while the electronic device 10 is activated, the controller 48 acquires the voltage value of the angle detecting unit 60 to ensure the initial folding/unfolding angle of the screen. Then, the controller 48 compares whether the initial folding/unfolding angle conforms to the threshold range, the hinge mechanism 16' is static while the initial folding/unfolding angle conforms to the threshold range, and the motor unit 56 is driven to rotate the rotation axle 50 via the axle coupling component 58 while the initial folding/unfolding angle does not conform to the threshold range. The second connecting component 54 and the second body 14 are rotated in accordance with the rotation axle 50, to adjust angles of depression and elevation of the screen (the second body 14) of the electronic device 10. While the rotation axle 50 is rotated, the angle detecting unit 60 immediately acquires the current rotary angle of the rotation axle 50, and the controller 48 continuously compares whether the rotary angle of the rotation axle 50 is within the threshold range; while the rotary angle is out of the threshold range, the instant situation conforms to a specific condition of automatically executing the angle rotation, the controller 48 drives the hinge mechanism 16' to control rotary directions and rotary angles of the second connecting component 54 and the related second body 14, the hinge mechanism 16' is stopped until the second body 14 is located at the predetermined angle.

Figure 12:
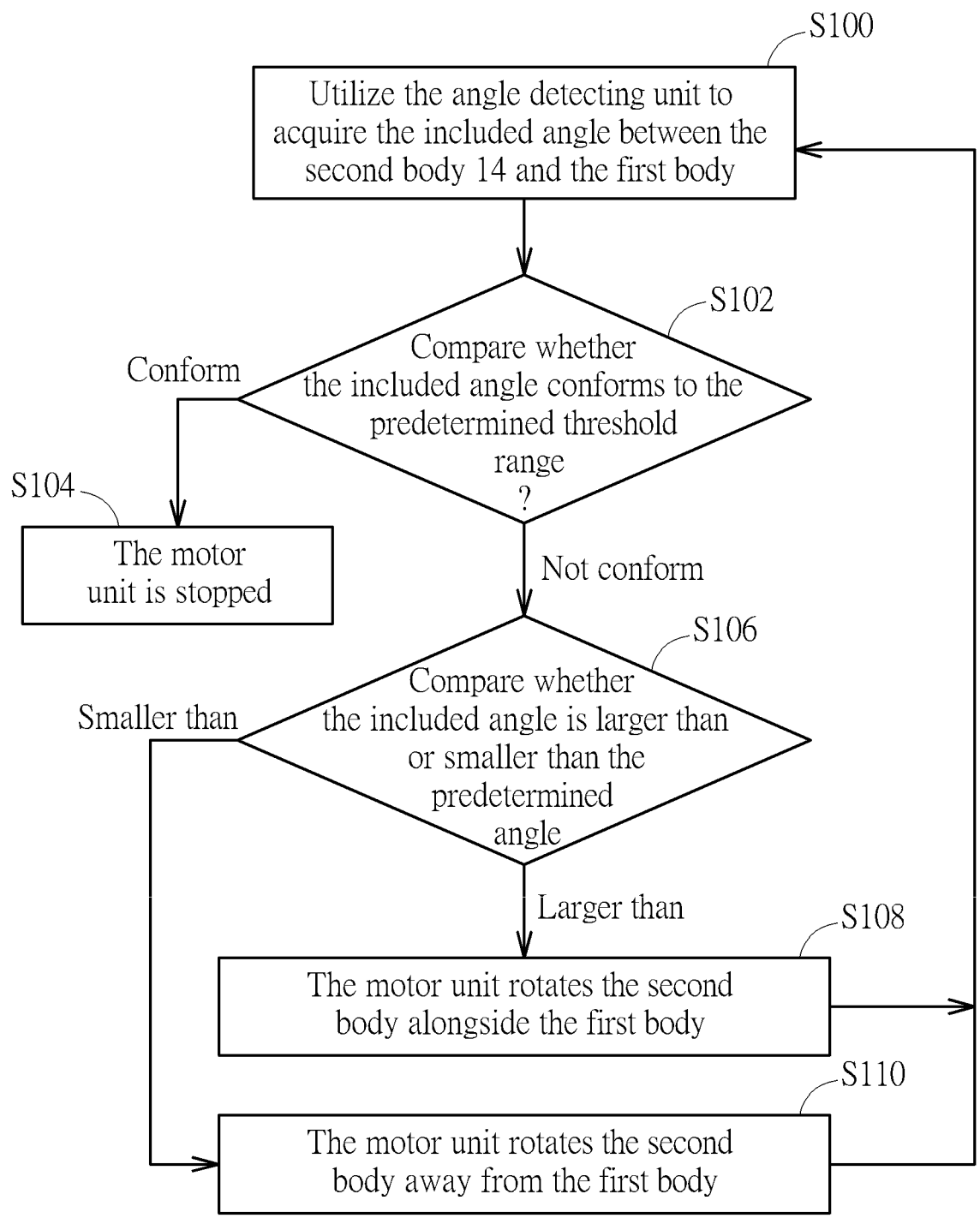
FIG. 12 is a flow chart of automatically executing the angle rotation according to the embodiment of the present invention.

Please refer to FIG. 12. FIG. 12 is a flow chart of automatically executing the angle rotation according to the embodiment of the present invention. The method illustrated in FIG. 12 is suitable for the electronic device 10 and the related hinge mechanism 16 of the first embodiment or the related hinge mechanism 16' of the second embodiment shown in FIG. 1. First, the controller 48 utilizes the angle detecting units 34 and 60 to acquire the included angle between the second body 14 and the first body 12 (step S100), wherein the included angle can be transformed by the voltage value generated by the angle detecting units 34 and 60. Then, the included angle is compared whether to conform to the predetermined threshold range (step S102). The motor units 32 and 56 are stopped since the included angle conforms to the predetermined threshold range (step S104), and the included angle is compared to determine whether the included angle is larger than or smaller than the predetermined angle since the included angle does not conform to the predetermined threshold range (step S106). While the included angle is larger than the predetermined angle, the motor units 32 and 56 drive the second body 14 to be forward rotated alongside the first body 12 (step S108); while the included angle is smaller than the predetermined angle, the motor units 32 and 56 drive the second body 14 to be backward rotated away from the first body 12 (step S110). After execution of steps S108 and S110, step S110 is preferably executed again till the included angle is adjusted to fit in with a predetermined state by the user.

The foresaid threshold range is a specific angle range (an allowance about the screen folding/unfolding angle parameters) of the second body 14 unfolded relative to the first body 12, and the included angle within the specific angle range belongs to a situation of the operational custom by the user. While the included angle (the initial folding/unfolding angle of the screen) acquired by the angle detecting units 34 and 60 does not conform to the threshold range, the included angle is compared with the predetermined angle (which can be a boundary value of the specific angle range, or other specific value) to determine whether an angle of the second body 14 unfolded relative to the first body 12 is large or small, and further to decide whether the motor units 32 and 56 drive forward rotation or backward rotation of the second body 14. The said threshold range and the predetermined angle not only can be pre-set by the user, but also can be decided by utilizing the camera 64 (which is shown in FIG. 1 and FIG. 2) of the electronic device 10 to execute human face identification procedure for determining the unfolding angle of the second body 14 relative to the first body 12. The controller 48 can analyze whether a human face pattern on the capturing image generated by the camera 64 is located within a predetermined position or a predetermined range inside the capturing image. The unfolding angle of the second body 14 may exceed a predetermined value since position of the human face pattern is lower, and the unfolding angle of the second body 14 may be smaller than the predetermined value since the position of the human face pattern is lifted, so that the controller 48 can execute the method of automatically executing the angle rotation to adjust the included angle of the second body 14 relative to the first body 12.

In conclusion, the present disclosure utilizes the angle detecting unit to detect the included angle of the screen relative to the host of the electronic device. The hinge mechanism can automatically rotate the screen to the predetermined angle (which can be set by the user) while the included angle is larger than or smaller than the predetermined value or the predetermined range. The hinge mechanism can be a uniaxial hinge design, the motor unit directly utilizes the rotation axle to rotate the screen relative to the host; further, the hinge mechanism can be a biaxial hinge design, the motor unit drives rotation of the rotating component, the rotating component does not move the first rotation axle while being rotated (which means the rotating component is idling), and the rotating component still can encircle the second rotation axle around the first rotation axle to rotate the screen relative to the host.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge mechanism capable of automatically executing angle rotation, comprising:
    a rotation axle;
    a first connecting component rotatably connected to the rotation axle;
    a second connecting component fixed to the rotation axle, wherein the first connecting component and the second connecting component are rotated on the same rotation axle annularly;
    an angle detecting unit disposed on an end of the rotation axle and adapted to acquire a rotary angle of the rotation axle;
    a motor unit connected to the rotation axle, the motor unit driving rotation of the rotation axle and the second connecting component in accordance with acquired information of the angle detecting unit; and
    an axle coupling component connected between the rotation axle and the motor unit, the motor unit driving the rotation of the rotation axle and the second connecting component via the axle coupling component;
    wherein the rotation axle is a pillar structure having an indentation, an end of the motor unit is a shaft structure having a concave, two ends of the axle coupling component are respectively engaged with the indentation of the rotation axle and the concave of the motor unit.

2. The hinge mechanism of claim 1, wherein an annular slot is formed on the rotation axle, the annular slot is sheathed by the first connecting component, and the second connecting component is engaged with the annular slot to be synchronously rotated in accordance with the rotation axle.

3. The hinge mechanism of claim 1, wherein the hinge mechanism further utilizes a fixing component passing through the axle coupling component to assemble with the rotation axle and/or the motor unit.

4. A hinge mechanism capable of automatically executing angle rotation, comprising:
- at least two rotation axles connected with each other in a non-coaxial manner;
- a transmission gear set engaged between the at least two rotation axles, the transmission gear set comprising two main gears and two sub gears, the two main gears being respectively disposed on the at least two rotation axles, and the two sub gears being engaged with each other and engaged between the two main gears so that rotation of the at least two rotation axles are synchronous;
- a rotating component connected to the at least two rotation axles;
- a motor unit connected to the rotating component, the motor unit driving the rotating component to rotate relative to one of the at least two rotation axles, so as to rotate the other rotation axle of the at least two rotation axles around the one of the rotation axles via the rotating component;
- an angle detecting unit connected to the motor unit or the rotating component and adapted to acquire a rotary angle of the rotating component generated by the motor unit; and
- an axle coupling component connected between the motor unit and the rotating component, the motor unit driving the axle coupling component to guide rotation of the rotating component;
- wherein the rotating component comprises a base portion and a stretching portion, the base portion is fixed to the axle coupling component and connected to the one of the rotation axles in a loose fit manner, an end of the stretching portion is connected to the base portion and the other end of the stretching portion is fixed to the other rotation axle.

5. The hinge mechanism of claim 4, wherein the rotating component pushes the other rotation axle and drives the other rotation axle to rotate around the one of the rotation axles via the transmission gear set.

6. The hinge mechanism of claim 4, further comprising:
- a bridging component, the angle detecting unit being connected to the rotating component via the bridging component.

7. The hinge mechanism of claim 6, wherein the motor unit is connected to the rotating component via the bridging component.

8. The hinge mechanism of claim 6, wherein the bridging component utilizes a bridging gear to engage with a toothed structure of the rotating component.

9. The hinge mechanism of claim 6, wherein the bridging component utilizes a bridging gear to engage with a toothed structure of the axle coupling component.

10. The hinge mechanism of claim 4, wherein a locking hole is formed on the axle coupling component, the rotating component further comprises a fixing component, the fixing component passes through the base portion and the locking hole to assemble with the rotating component and the axle coupling component.

11. The hinge mechanism of claim 6, wherein the bridging component is a gear set or a transmission belt set.

12. The hinge mechanism of claim 4, wherein the one of the rotation axles is static while the rotating component is rotated by the axle coupling component.

13. The hinge mechanism of claim 4, further comprising:
- at least one twisting component, two ends of the at least one twisting component being respectively disposed on the at least two rotation axles, or the at least one twisting component being disposed on at least one of the at least two rotation axles.

* * * * *